United States Patent
Marcelot et al.

(10) Patent No.: US 12,358,645 B2
(45) Date of Patent: Jul. 15, 2025

(54) SYSTEM FOR MONITORING THE OPERATIONAL STATUS OF AN AIRCRAFT BETWEEN SUCCESSIVE MISSIONS OF THE AIRCRAFT, AND ASSOCIATED METHOD

(71) Applicant: DASSAULT AVIATION, Paris (FR)

(72) Inventors: Virginie Marcelot, Merignac (FR); Rémi Breban, Merignac (FR)

(73) Assignee: DASSAULT AVIATION, Paris (FR)

( * ) Notice: Subject to any disclaimer, the term of this patent is extended or adjusted under 35 U.S.C. 154(b) by 311 days.

(21) Appl. No.: 17/175,905

(22) Filed: Feb. 15, 2021

(65) Prior Publication Data

US 2021/0253275 A1   Aug. 19, 2021

(30) Foreign Application Priority Data

Feb. 17, 2020 (FR) ...................... 20 01532

(51) Int. Cl.
*B64F 5/60* (2017.01)
*B64D 43/00* (2006.01)
(Continued)

(52) U.S. Cl.
CPC ................ *B64F 5/60* (2017.01); *B64D 43/00* (2013.01); *B64D 45/00* (2013.01); *G07C 5/085* (2013.01); *B64D 2045/0075* (2013.01)

(58) Field of Classification Search
CPC ........... B64F 5/60; B64D 43/00; B64D 45/00; B64D 2045/0075; G07C 5/085
See application file for complete search history.

(56) References Cited

U.S. PATENT DOCUMENTS 8,700,236 B1 * 4/2014 Berman ................. G07C 5/008
                                                          701/16
2003/0033178 A1   2/2003 Black et al.
(Continued)

FOREIGN PATENT DOCUMENTS

EP      2642466 A1    9/2013
WO   WO2018217210 A1  11/2018

OTHER PUBLICATIONS

Scandura, Jr. "Unified System to Provide Crew Alerting Electronic Checklists and Maintenance Using IVHM" IEEE 2004 (Year: 2004).*

(Continued)

*Primary Examiner* — John C Kuan
(74) *Attorney, Agent, or Firm* — Davidson Kappel LLC

(57) ABSTRACT

A system for monitoring the operational status of an aircraft between successive missions of the aircraft includes a computer able to determine at least one operational impact measurement on at least one future mission of the aircraft related to the aircraft and/or to an aircraft equipment and/or to a consumable and/or to the aircraft crew, the operational impact measurement being determined as a function of the flight logbook and/or technical logbook data of at least one already completed mission of the aircraft and/or a context of the future mission. The system includes a display and a display manager on the display, able to display on the display at least one operational impact indicator related to the aircraft and/or to the equipment and/or to the consumable and/or to the crew, as a function of the operational impact measurement determined by the computer.

16 Claims, 6 Drawing Sheets

(51) Int. Cl.
*B64D 45/00* (2006.01)
*G07C 5/08* (2006.01)

(56) References Cited

U.S. PATENT DOCUMENTS

| | | | | |
|---|---|---|---|---|
| 2010/0049379 | A1* | 2/2010 | Vial | G07C 5/0816 |
| | | | | 701/3 |
| 2013/0274992 | A1* | 10/2013 | Cheriere | G06F 11/0739 |
| | | | | 701/32.9 |
| 2015/0232097 | A1* | 8/2015 | Luther | G01C 21/3415 |
| | | | | 701/1 |
| 2016/0378076 | A1* | 12/2016 | Hill | G05B 19/4184 |
| | | | | 700/28 |
| 2017/0233105 | A1* | 8/2017 | Vali | B64F 5/40 |
| | | | | 701/3 |
| 2019/0295425 | A1* | 9/2019 | Grimald | G08G 5/0013 |
| 2020/0100165 | A1* | 3/2020 | Hosier, Jr. | G06Q 30/0269 |
| 2020/0103897 | A1* | 4/2020 | Thornberg | B64D 43/00 |
| 2021/0183252 | A1* | 6/2021 | Bittar | G08G 5/003 |

OTHER PUBLICATIONS

Search Report for priority application FR 2001532.

* cited by examiner

SYSTEM FOR MONITORING THE OPERATIONAL STATUS OF AN AIRCRAFT BETWEEN SUCCESSIVE MISSIONS OF THE AIRCRAFT, AND ASSOCIATED METHOD

This claims priority of French patent application FR 20 01532 filed Feb. 17, 2020 and hereby incorporated by reference herein.

The present disclosure relates to a system for monitoring the operational status of an aircraft between successive missions of the aircraft, comprising:
- an interface for entering and/or loading sets of data from the aircraft logbook and technical logbook, each set of data corresponding to a successive flight of the aircraft during at least one mission;
- an interface for entering and/or loading a mission context containing mission information data of at least one future mission of the aircraft.

Such a system is intended to be implemented preferably in a cockpit of the aircraft, during the preparation of a future mission of the aircraft, in particular to determine whether equipment with a validity date and/or consumables such as fuel, oil or water, are likely to impact one or more future missions to be carried out. Alternatively, the system is implemented outside the cockpit with mobile equipment (tablet, telephone, etc.).

BACKGROUND

To enable effective monitoring of an aircraft's operating status, and the passage of information between successive crews of the aircraft, regulations require the crew, at the start and end of each flight, to fill out a flight logbook to record flight logbook data including, in particular, the fuel present at the start and end of the flight, the date of the flight, the flight completed, the pilots who carried out take-off and landing manoeuvres, etc.

This data is generally filled out in the form of a paper document that is then exchanged between the different operational staff (pilot, crew making the next flight, operational administrator) to determine the operational status of the aircraft, the consumable requirements and for them to analyze whether this status is compatible with the mission to be carried out.

Furthermore, the aircraft also has a technical logbook, which lists the equipment and databases installed in the aircraft. The maintenance operators, the crew and/or the operational administrator responsible for the configuration of the operational functions should in particular indicate, for safety equipment, the date on which it was installed in the aircraft or, for databases, the configuration that is installed in the aircraft. By "crew" is meant here in the broadest sense the pilots and cabin crew.

Each crew, on arriving in the aircraft must therefore determine whether the safety equipment present in the aircraft is still valid, whether the validity dates of the databases loaded in the aircraft are in conformity, whether there is no maintenance visit planned for the aircraft during the next mission, in particular if it includes several flights, and whether the regulatory obligations of the pilots in terms of the number of take-offs and landings to be carried out are well fulfilled for the aircraft in question.

Furthermore, the crew is often responsible for managing the consumables present in the aircraft, in particular fuel, and generally ensure that the quantity of fuel loaded is correct, and that the aircraft's fuel gauge is monitored with independent values.

Moreover, the crew must ensure that the various consumables are consistent with the planned mission, particularly with regard to oil, water and waste levels, as well as tire pressure.

All these operations must therefore be carried out on the basis of data collected by other crews using paper forms, which is tedious and can in some cases lead to delays in the departure of the aircraft.

To simplify the management of the aircraft, it is known to record flight logbook and technical logbook data in electronic form, for example using a human machine interface (HMI) present in the aircraft or using a portable electronic device.

However, even if it is easier to access data from previous missions, the pilot must still analyze the data and try to predict whether events relating to equipment or consumables are likely to affect aircraft operations on a future mission. It is also very difficult for the pilot to anticipate within the scope of missions presenting successive flights whether equipment or consumables will have to be processed between two flights.

One object of the present disclosure is therefore to provide technical assistance to the pilot of an aircraft in preparation for a mission or after a mission, to determine whether the or each mission he must carry out is possible, given the equipment and consumables available to him in the aircraft.

SUMMARY

A system of the aforementioned type is provided that includes a computer able to determine at least one operational impact measurement on at least one future mission of the aircraft related to the aircraft and/or to an equipment and/or a consumable of the aircraft and/or to the crew of the aircraft, the operational impact measurement being determined as a function of the flight logbook and/or technical logbook data of at least one already carried out mission of the aircraft and/or in a context of the future mission, the system comprises a display device and a display manager on the display device, able to display on the display device at least one operational impact indicator related to the aircraft and/or equipment and/or consumable and/or aircraft crew, as a function of the operational impact measurement determined by the computer.

The system may comprise one or more of the following features, taken alone or in any technically possible combination:
- the operational impact measurement is chosen between a first value of an operational impact on the mission to be carried out and a second value of no operational impact on the mission to be carried out;
- the interface for entering and/or loading flight logbook and technical logbook data sets of the aircraft, is able to acquire a level of consumables at the end of each aircraft mission and/or at the start of each aircraft mission;
- the consumable levels are selected from a fuel level, a water level, an oil level, a waste level, and/or an air pressure level in an aircraft tire;
- the computer is able to calculate an operational impact date affecting the aircraft and/or equipment and/or a database based on the flight logbook and/or technical logbook data or by using the database update due date data, and then to compare the operational impact date with the date of the future mission obtained from the input and/or loading interface of a mission context to determine the operational impact measurement;

the computer is able to calculate the operational impact date from the technical logbook data obtained from the interface for entering and/or loading flight logbook and technical logbook data sets, where the technical logbook data includes at least one date of a scheduled maintenance visit or data of at least one failure and/or defect discovered on a previous mission;

the computer is able to calculate an operational impact date relating to the validity of a physical equipment, based on an equipment installation date retrieved from the technical logbook data and a predefined equipment lifetime;

the computer is able to determine an operational impact measurement for which a pilot no longer meets the regulatory requirements based on the number of take-offs and landings made by the pilot on the aircraft in question, on the basis of flight logbook data obtained from the interface for entering and/or loading flight logbook and technical logbook data sets for the aircraft;

the computer is able to determine an estimated level of consumable present in the aircraft on the basis of the flight logbook data obtained from the interface for entering and/or loading the aircraft's flight logbook and technical logbook data sets, and to compare it with a measured or recorded level of consumable to obtain the operational impact measurement;

the computer is able to determine a level of consumable present at the end of a future mission based on an estimate of a level of consumable consumed during the mission obtained from flight logbook data via the interface for entering and/or loading flight logbook and technical logbook data sets and mission context data via the interface for entering and/or loading a mission context;

it comprises a module for entering a new mission context for a new mission that allows the loading and/or entering of data for at least one future mission;

the interface for entering and/or loading a mission context is suitable for allowing the entering and/or loading of mission context data for a plurality of successive future missions of the aircraft, the computer being able to determine, for each future mission of the aircraft, an operational impact measurement related to the aircraft and/or to equipment and/or a consumable and/or to the crew of the aircraft for each future mission of the aircraft.

A method is also provided for monitoring the operational status of aircraft equipment and/or consumable comprising the following steps:

provision of a system as defined above;

retrieving flight logbook and technical logbook data through the interface for entering and/or loading flight logbook and technical logbook data sets;

retrieval of mission context data through the interface for entering and/or loading a mission context for at least one future mission to be carried out by the aircraft;

determination by the computer of at least one operational impact measurement related to the aircraft and/or to an equipment and/or a consumable of the aircraft and/or to the crew on at least the future mission of the aircraft according to the flight logbook and/or technical logbook data of missions already carried out by the aircraft and/or a context of the future mission;

display on the display device by the display manager of at least one operational impact indicator corresponding to the operational impact measurement determined by the computer.

The method may include the following features:

the determination of the operational impact measurement is carried out after the end of a mission of the aircraft, and before a new mission of the aircraft.

BRIEF DESCRIPTION OF THE DRAWINGS

The present disclosure will be better understood by reading the description that follows, given only as an example, and made with reference to the appended drawings, on which.

DETAILED DESCRIPTION

Figure 1:
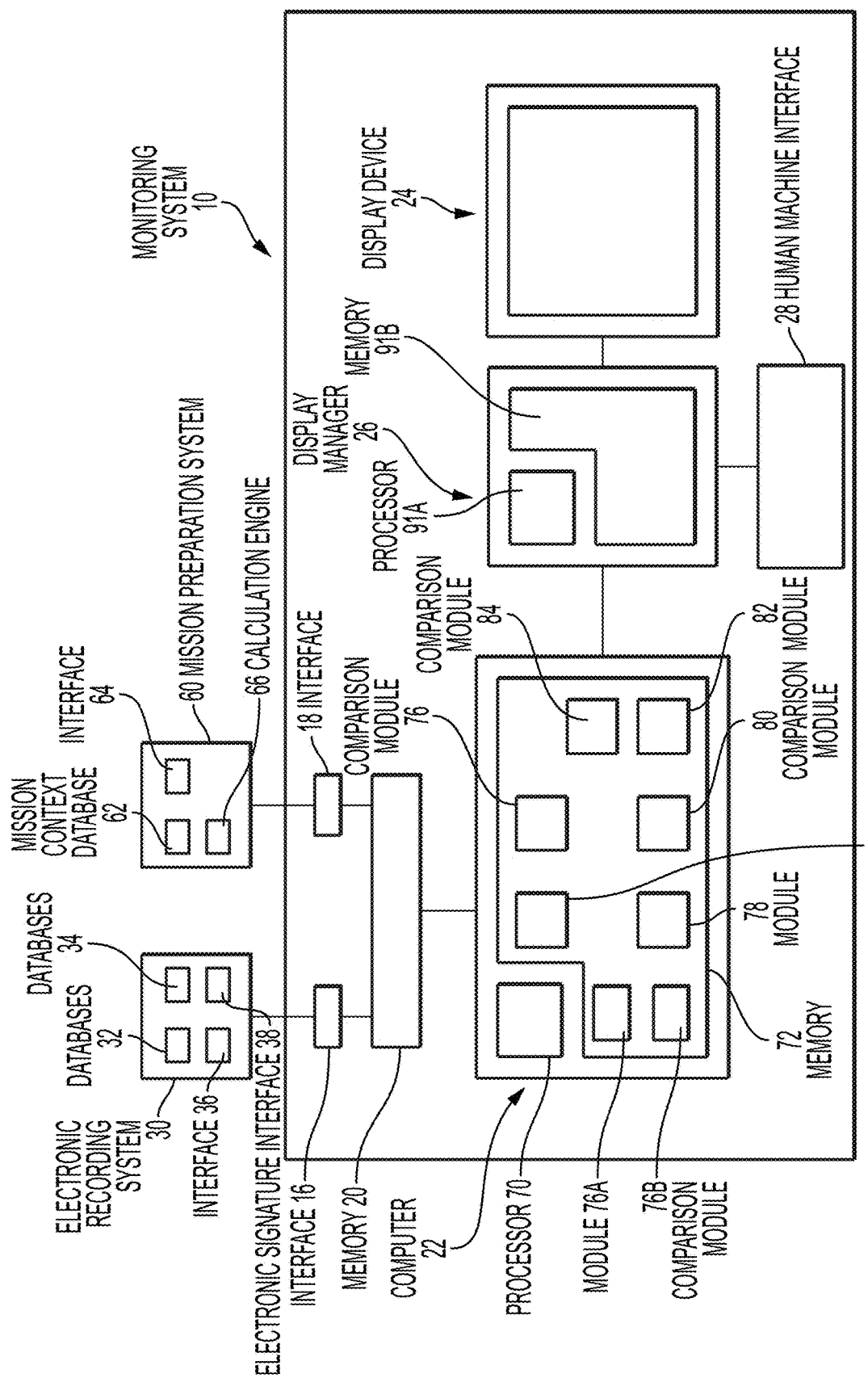
FIG. 1 is a synoptic diagram illustrating the components of a monitoring system according to the present disclosure.

A first monitoring system 10 for monitoring the status of aircraft equipment and/or consumables is shown in FIG. 1.

Figure 2:
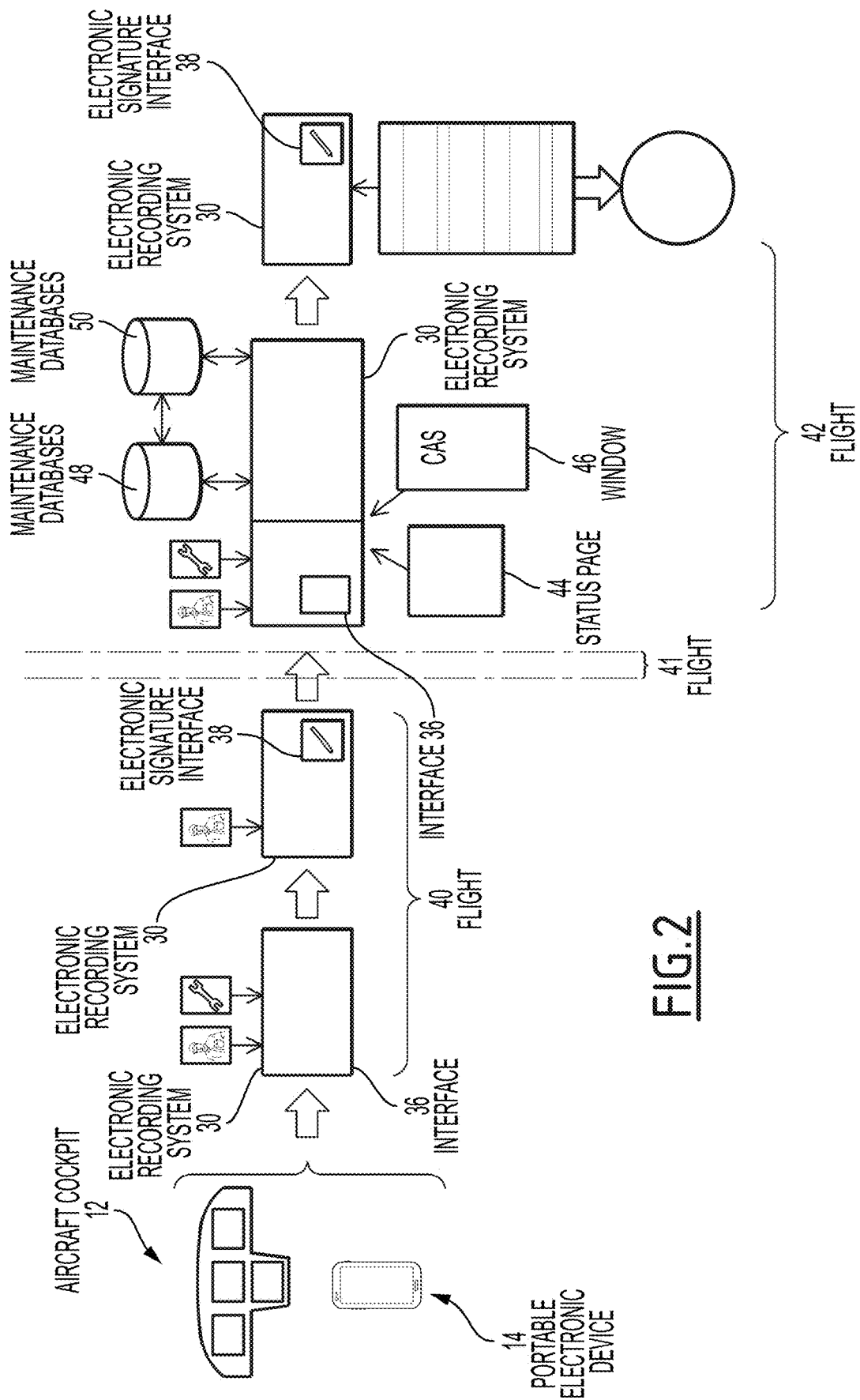
FIG. 2 illustrates the collection of aircraft data sets in an flight logbook and technical logbook storage system, before a flight and after a flight.

For example, this monitoring system 10 is an on-board system intended to be integrated into the aircraft cockpit 12 shown schematically in FIG. 2. Alternatively, the monitoring system 10 is integrated into a portable electronic device 14 not onboard, such as an Electronic Flight Bag.

The monitoring system 10 according to the present disclosure comprises an interface 16 for entering and/or loading flight logbook and technical logbook data sets, each data set corresponding to a successive flight of the aircraft during at least one mission carried out by the aircraft. In addition, the monitoring system 10 comprises a mission context data entering and/or loading interface 18 to allow the entering and/or loading of a mission context corresponding to at least one future flight of the aircraft.

The monitoring system 10 comprises at least one storage memory 20 for storing the flight logbook and technical logbook data sets, retrieved by the interface 16, and for storing the mission context data of at least one future mission of the aircraft, retrieved by interface 18.

The storage memory 20 is capable of additionally containing database updates due date data, for all databases onboard the aircraft.

This relates for example to navigation databases, ground proximity measurement databases, head-up display databases loaded in the aircraft avionics.

The update dates are, for example, loaded into the storage memory 20 via a data transmission network, for example annually or monthly.

The monitoring system 10 comprises at least one computer 22 able to calculate at least one operational impact measurement on at least one future aircraft mission, where the operational impact measurement is related to the aircraft, and/or equipment with a validity date and/or aircraft consumable and/or aircraft crew.

The operational impact measurement is determined based on flight logbook and technical logbook data from at least one mission already completed, and advantageously, in a context of a future mission.

The monitoring system 10 also includes a display device 24 and a display manager 26 on the display device, able to display on the display device 24 at least one operational impact indicator related to the aircraft, and/or the equipment and/or consumable and/or crew, obtained from the operational impact measurement determined by the computer 22.

The monitoring system 10 also advantageously includes a human machine interface 28, consisting of a keyboard, mouse and/or touch screen.

The interface 16 for entering and/or loading flight logbook and technical logbook data sets is suitable for connection to an electronic recording system 30 for recording flight logbook and technical logbook data sets.

As shown in FIG. 1, the electronic recording system 30 comprises at least one database 32 of flight logbook data sets, at least one database 34 of technical logbook data sets, an interface 36 for automatic or manual flight or maintenance data capture and acquisition, and an electronic signature interface 38.

The electronic recording system 30 includes, for example, a computer comprising a processor and a memory containing software modules that can be executed by the processor. It is integrated, for example, in the aircraft cockpit 12 or in a portable electronic device 14.

The automatic and/or manual data entry interface 36 is able to interrogate the aircraft's aircraft systems at the start and end of each flight to retrieve flight logbook and technical logbook data.

As illustrated in FIG. 2, the interface 36 is able to be activated at the start of the flight 40 or at the end of the flight 42 to allow user input or automatic entry of flight logbook and technical logbook data sets.

The flight logbook data includes for example for each flight, the identity of the aircraft, the type of aircraft, the nature of the flight, the date of the flight. It also includes operational data, including de-icing start and end times, type of de-icing product used, fuel remaining data, calculated fuel addition data, actual fuel data measured at the point of departure, estimated fuel consumed during the flight for the prepared flight, and actual fuel consumed data.

The flight logbook data also includes a fuel density related to each actual fuel data recorded.

The flight logbook data also includes data for aircraft oil present, aircraft water and waste levels present, and tire pressures measured in the aircraft.

The flight logbook data also includes the type of approach flown, any indication of flight in ETOPS (Extended-range Twin-engine Operation Performance Standards) condition, the identification of the pilot and co-pilot conducting the flight, identification of the number of passengers on the flight, block departure time, take-off time, departure airport, arrival airport, landing time, time on the block, flight time and time to arrive at the block.

The flight logbook data also includes the signatures of the crew personnel validating the data entered in the flight logbook.

The main data present in a flight logbook are shown above, each operator has the possibility to add more data.

The technical logbook data includes a report of all defects and/or failures found on the aircraft in the previous flight and the maintenance actions carried out to remedy the defects and/or failures, and/or preventive maintenance carried out.

They also include the list of safety equipment present on the aircraft, the date of installation of this equipment, and the expiry date of this equipment.

The technical logbook data also includes dates of scheduled maintenance visits for the aircraft.

As can be seen in FIG. 2, databases 32 and 34 are suitable to be input by a user, such as a pilot, a maintenance agent, or a flight operations administrator 41 in the preparation phase of flight 40, or after flight 41 during the recovery phase 42 of the aircraft.

In particular, the pilot and the maintenance agent are able to enter the defects and/or failures present on the status page 44 and on the crew-alerting system (CAS) window 46.

Alternatively or as a complement, the data from the status page 44 and window 46 of the crew-alerting messages are automatically retrieved from the aircraft and stored in the storage memory 20.

The interface 36 is also able to automatically connect to the maintenance databases 48 and 50, particularly at the end of flight 42 to collect data on maintenance carried out on the aircraft.

The signature interface 38 is able to be activated to allow the pilot to validate the entry of a flight logbook and/or technical logbook data set of the aircraft at the start of each flight and at the end of each flight.

With reference to FIG. 1, the mission context input and/or load interface 18 is able to connect to a mission preparation system 60 to collect mission context data for successive future missions of the aircraft.

The mission preparation system 60 is, for example, integrated into the cockpit 12, or is present in a portable electronic device 14 of the aircraft. It comprises at least one computer comprising a processor and a memory comprising software modules that can be executed by the processor.

The mission preparation system 60 typically comprises a mission context database 62 and an interface 64 for entering new mission context data to define the context of a new mission for the aircraft.

The mission context includes a departure field, arrival field, mission date, and mission time. It also includes a number of passengers present in the mission, and possibly an aircraft configuration for the mission, as well as, advantageously, a meteorological context to carry out the mission.

The mission context advantageously includes a planning of the identity of the pilot in charge of take-off and landing for each flight of the future mission.

The mission context is defined for each flight of a future mission.

With reference to FIG. 1, the operational impact measurement computer 22 comprises a processor 70 and a memory 72 including a plurality of software modules that can be executed by the processor 70.

For the monitoring of operational data likely to have an impact on the mission, the operational impact measurement computer 22 comprises in particular, a module 74 for calculating the date of the operational impact affecting the aircraft and/or a physical or software equipment of the aircraft, on the basis of the flight logbook or technical logbook data, or even database update deadline data stored in memory 20 and a module 76 for comparing the calculated date of the operational impact with a future mission date to determine an operational impact measurement on the mission to be carried out.

For monitoring the operational impact of crew operational requirements, the computer 22 comprises a module 76A for calculating a number of take-offs and landings carried out by each pilot after each flight of a future mission over a given period of time and a module 76B for comparing with a minimum number of take-offs and/or landings to be carried out by each pilot over the given period of time.

The number of take-offs and landings is, for example, evaluated per 90-day period. Alternatively or as a complement, the number of day/night landings is evaluated over a given period of time.

To monitor the operational impact of a consumable level measurement, the computer 22 includes a module 78 for determining an estimated consumable level present in the aircraft, based on flight logbook data and/or real time data records indicating the quantities of consumables from aircraft systems, and a module 80 for comparison with a measured or recorded consumable level to determine a measure of operational impact on this consumable level measurement.

To monitor the operational impact of a level of consumable on a future mission, the computer 22 comprises a module 82 for determining a level of consumable likely to be consumed during a future aircraft mission, based on mission information data, and a module 84 for comparing the level of consumable likely to be consumed with a measured or recorded level of consumable to determine a measure of the operational impact of the quantity of consumable present in the aircraft.

For example, the operational impact date calculation module 74 is able to retrieve technical logbook data from the memory 20 to obtain an operational impact date corresponding to the date of the next scheduled maintenance to be carried out.

Advantageously, the operational impact date calculation module 74 is able to retrieve from the memory 20, data of defects and/or failures present in the aircraft and to calculate an operational impact date corresponding to the deadline of at least one corrective maintenance to be carried out on the basis of the defects and/or failures present in the aircraft.

The comparison module 76 is then able to retrieve mission context data from the memory 20 to determine the mission date on which each successive mission of the aircraft must be carried out, and to define an operational impact measurement, for example in the form of a Boolean indicator.

This operational impact measurement makes it possible to verify that the scheduled maintenance or corrective maintenance dates are compatible with the flight dates defined in the mission information obtained from the mission preparation system 60.

If the operational impact date corresponding to the next scheduled or corrective maintenance of the aircraft is before the mission date, the comparison module 76 is able to define a scheduled or corrective maintenance operational impact measurement with a first value corresponding to an impact on the mission.

On the contrary, if the operational impact date corresponding to the next scheduled or remedial maintenance of the aircraft is after the mission date, the comparison module 76 is able to define a scheduled or remedial maintenance operational impact measurement with a second value corresponding to no impact on the mission.

As an alternative or as a complement, the operational impact date calculation module 74 is able to retrieve from the memory 20 the technical logbook data to obtain a date of installation of physical equipment in the aircraft, as well as the period of validity of the physical equipment concerned, in order to calculate an operational impact date corresponding to the end date of validity of the equipment.

Examples of equipment are safety equipment present in the aircraft, such as safety glasses, fire extinguishers, first aid kits.

The comparison module 76 is also able to retrieve mission context data from the memory 20 to determine the date of the mission at which each successive mission of the aircraft must be carried out, and to define an operational impact measurement, for example in the form of a Boolean indicator.

If the operational impact date corresponding to the equipment validity date is before the mission date, the comparison module 76 is able to define an equipment validity operational impact measurement with a first value corresponding to a mission impact.

On the contrary, if the operational impact date corresponding to the equipment validity date is after the mission date, the comparison module 76 is able to define an equipment validity operational impact measurement with a second value corresponding to no impact on the mission.

Alternatively or as a complement, the operational impact date calculation module 74 is able to retrieve from the memory 20, database update deadline data to determine the operational impact date constituted by the next deadline for updating the or each database according to the current configuration.

The comparison module 76 is then able to retrieve from the memory 20, mission context data to determine the date of the mission at which each successive mission of the aircraft must be carried out, and to define an operational impact measurement, for example in the form of a Boolean indicator.

This operational impact measurement makes it possible to check that the update deadlines for each database are compatible with the flight dates defined in the mission context obtained from the mission preparation system 60. This avoids the need to update a heavy database and/or a database in a location with low data transfer capacity.

If the operational impact date corresponding to the database update deadline is before the mission date, the comparison module 76 is able to define a database update operational impact measurement with a first value corresponding to an impact on the mission.

On the contrary, if the operational impact date corresponding to the database update deadline is after the mission date, the comparison module 76 is able to define a database update operational impact measurement with a second value corresponding to no impact on the engagement.

Similarly, the module 76A for calculating the number of take-offs and landings carried out by each pilot after each flight of a future mission is able to determine the number of landings and/or take-offs over a given period carried out by a given pilot based on the flight logbook data and planning of the identity of the pilot in charge of the take-off and landing of each flight of the future mission.

The comparison module 76B is then able to compare this calculated number of take-offs and/or landings carried out by each given pilot with a minimum number of take-offs and/or landings to be carried out by each pilot over a given period of time resulting from regulatory requirements and to define an operational impact measurement, for example in the form of a Boolean indicator.

If the calculated number of take-offs and/or landings carried out by at least one given pilot during the given period is less than the minimum number of take-offs and/or landings to be carried out during the given period, the comparison module 76 is able to define an operational impact measurement of regulatory crew obligations having a first value corresponding to an impact on the mission.

On the contrary, if the calculated number of take-offs and landings carried out by at least one given pilot during the given period is greater than the minimum number of take-offs and/or landings to be carried out during the given period, the comparison module 76 is able to define an operational impact measurement of regulatory crew obligations with a second value corresponding to no impact on the mission.

Such a comparison is applicable for a pilot who carries out all his flights on the aircraft in question.

Figure 5:
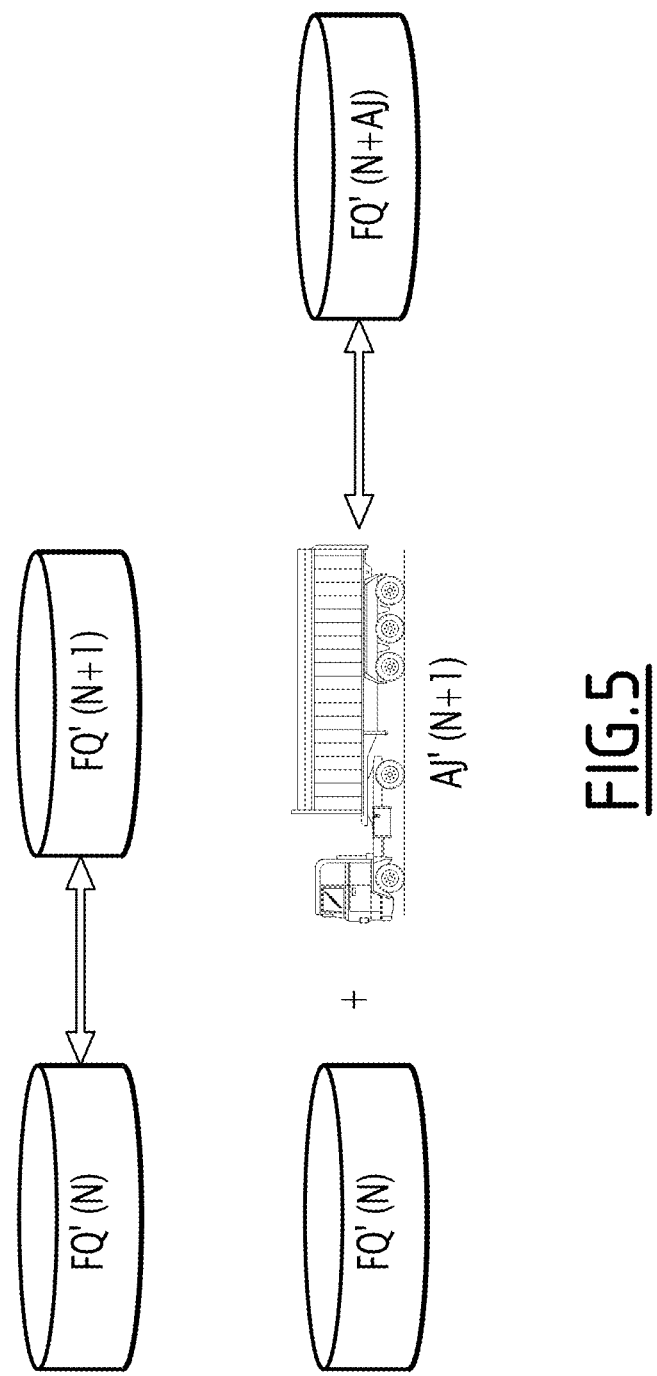
FIG. 5 is a view illustrating the principle of fuel gauge control.
Figure 6:
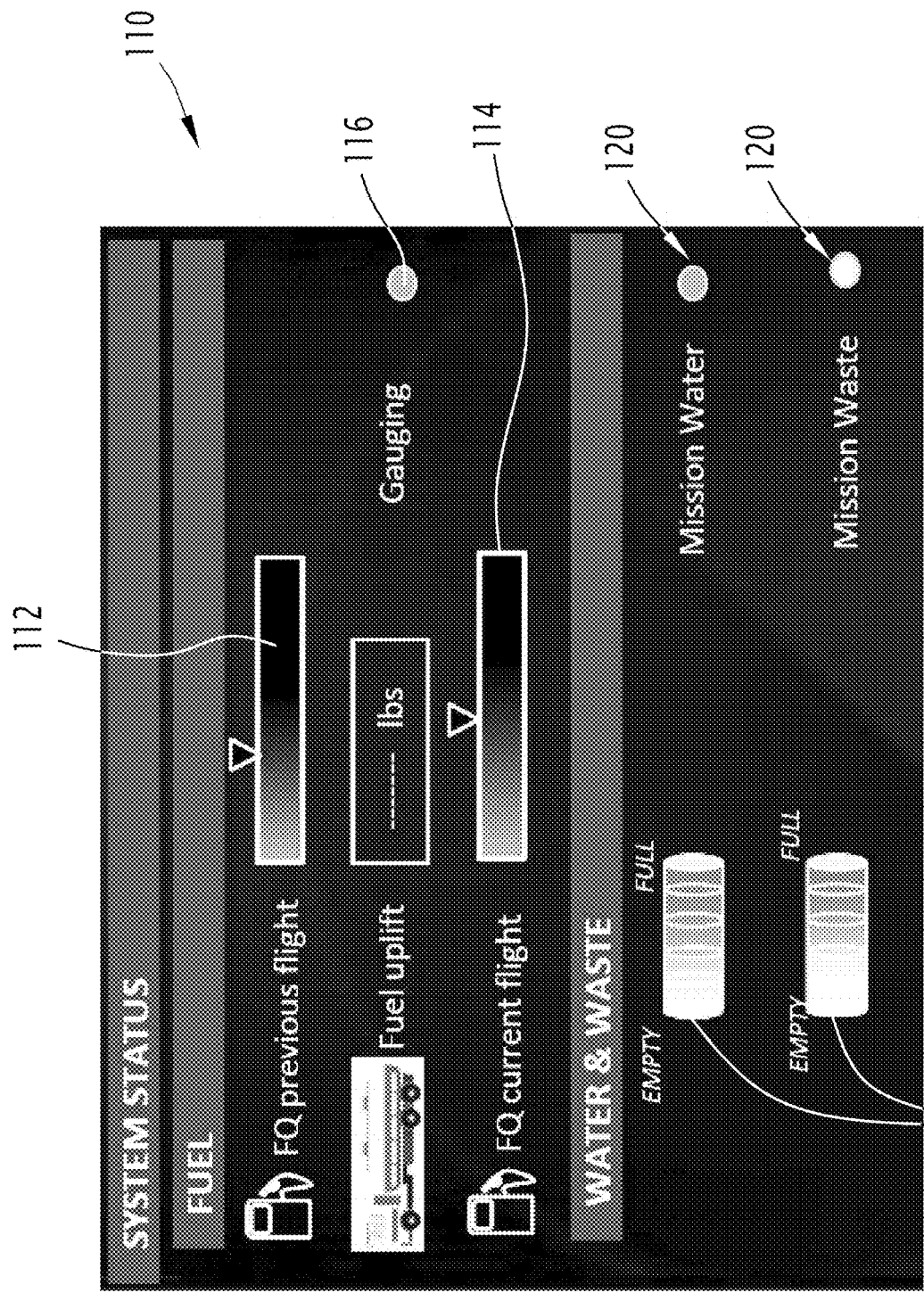
FIG. 6 is a view of a consumable status tracking window illustrating the status of fuel, water, and waste in the aircraft, each being fitted with an operational impact indicator.

With reference to FIG. 5, the module 78 for determining an estimated level of consumable present in the aircraft is able, for example, to determine from the flight logbook data, the quantity of FQ(N) fuel present in the aircraft at the end of the previous flight and to divide it by the density of the fuel determined at the time of the survey to obtain a quantity of fuel independent of the FQ'(N) density.

The comparison module 80 with a measured or recorded level of consumable is able to calculate the difference between the quantity of fuel FQ'(N) present in the aircraft independent of density, at the end of the previous flight and the quantity of fuel FQ(N+1) present in the aircraft at the start of the following flight divided by the density at the start of the flight, showing a quantity of fuel FQ'(N+1) present in the aircraft at the start of the following flight independent of density. This difference allows to determine a measure of operational impact of fuel leakage for example in the form of a Boolean indicator.

If the difference between the quantities of fuel FQ'(N), FQ'(N+1) independent of density is greater than a predefined threshold value, the comparison module 80 is able to define an operational impact measurement of consumable leakage with a first value corresponding to an impact on the mission.

On the contrary, if the difference between the density independent fuel quantities FQ'(N), FQ'(N+1) is less than a predefined threshold value, the comparison module 80 is able to define an operational impact measurement of consumable leakage with a second value corresponding to no impact on the mission.

In the case of a fuel addition, the module 78 for determining an estimated level of consumable present in the aircraft is able to determine a first value for the level of fuel present in the aircraft after the addition of fuel FQ'(N)+AJ'(N+1) independent of density, on the basis of flight logbook data comprising the amount of fuel FQ(N) present in the aircraft at the end of the previous flight, divided by the density at the end of the previous flight, designated as FQ'(N+1), and the amount of fuel added at the start of the following flight AJ(N+1), divided by the density at the start of the following flight, designated as AJ'(N+1).

The comparison module 80 with a measured or recorded fuel level is able to calculate the difference between the first value of fuel level present in the aircraft after the addition of fuel FQ'(N)+AJ'(N+1) independent of the density and the quantity of fuel FQ(N+AJ) present in the aircraft at the start of the next flight, divided by the density at the start of the next flight, designated as FQ'(N+AJ). This allows the determination of an operational impact measurement of the consumable level gauge, for example in the form of a Boolean indicator.

If the difference between the fuel quantities FQ'(N)+AJ'(N+1), FQ'(N+AJ) independent of the density is greater than a predefined threshold value, the comparison module 80 is able to define a consumable level gauge operational impact measurement with a first value corresponding to an impact on the mission.

On the contrary, if the difference between the fuel quantities FQ'(N)+AJ'(N+1), FQ'(N+J) independent of the density is less than a predefined threshold value, the comparison module 80 is able to define an operational impact measurement with a second value corresponding to no mission impact.

Based on the mission context data, the module 82 for determining a level of consumable likely to be consumed during a future aircraft mission is able to determine an oil level and/or water level likely to be consumed during the mission and a level of waste likely to be produced during the mission.

It comprises a calculation engine able to calculate mission parameters, such as fuel consumption or consumption of another consumable, in particular water, oil, or such as waste generation, based on the mission context data defined above, obtained via the interface 18.

The comparison module 84 is able to determine the difference between the oil level, water level and estimated waste level at the end of the mission, obtained from flight logbook data via the interface 16, and the oil level, water level and waste level present at the start of the mission obtained advantageously from aircraft systems. This enables the definition of an operational impact measurement of consumable levels, in the form of a Boolean indicator.

If the difference between the water or oil level present at the start of the mission, as obtained from flight logbook data, and the water or oil level likely to be consumed during the aircraft's future mission is less than a threshold value, or if the sum of the level of waste likely to be produced during the mission and the level of waste present in the aircraft at the start of the mission is greater than a threshold value, the comparison module 80 is able to define an operational impact measurement of the level of consumable with a first value corresponding to an impact on the mission.

On the contrary, if the difference between the water or oil level present at the start of the mission, as obtained from the flight logbook data, and the water or oil level likely to be consumed during the aircraft's future mission is less than a threshold value, or if the sum of the level of waste likely to be produced during the mission and the level of waste present in the aircraft at the start of the mission is less than a threshold value, the comparison module 80 is able to define an operational impact measurement of the level of consumable with a second value corresponding to no impact on the mission.

Advantageously, the module 78 for determining an estimated level of consumable present in the aircraft is able to calculate the difference between the pressures of two aircraft tires measured at the end of each mission.

The two tires of the aircraft are preferably a pair of tires of the same aircraft landing gear, for example the two tires of the left landing gear or the two tires of the right landing gear.

The comparison module 80 with a measured or recorded consumable level is able to calculate the variation in tire pressure difference, between the difference calculated at the end of the previous flight and the difference calculated at the start of the next flight, to determine an operational impact measurement of inflation gas leakage, for example in the form of a Boolean indicator.

If the variation between the tire pressure differences is greater than a predefined threshold value, the comparison module 80 is able to define an operational impact measurement of inflation gas leakage with a first value corresponding to a mission impact.

On the contrary, if the variation between tire pressure differences is less than a predefined threshold value, the comparison module 80 is able to define an operational impact measurement of inflation gas leakage with a second value corresponding to no impact on the mission.

For example, the display manager 26 includes a processor 91A and a memory 91B comprising software modules that can be executed by the processor.

The display manager 26 is able to retrieve the operational impact measurements determined by the computer 22 to create operational impact monitoring windows for the aircraft user, which are selectively displayed on the display device 24 for the attention of the aircraft user.

Figure 3:
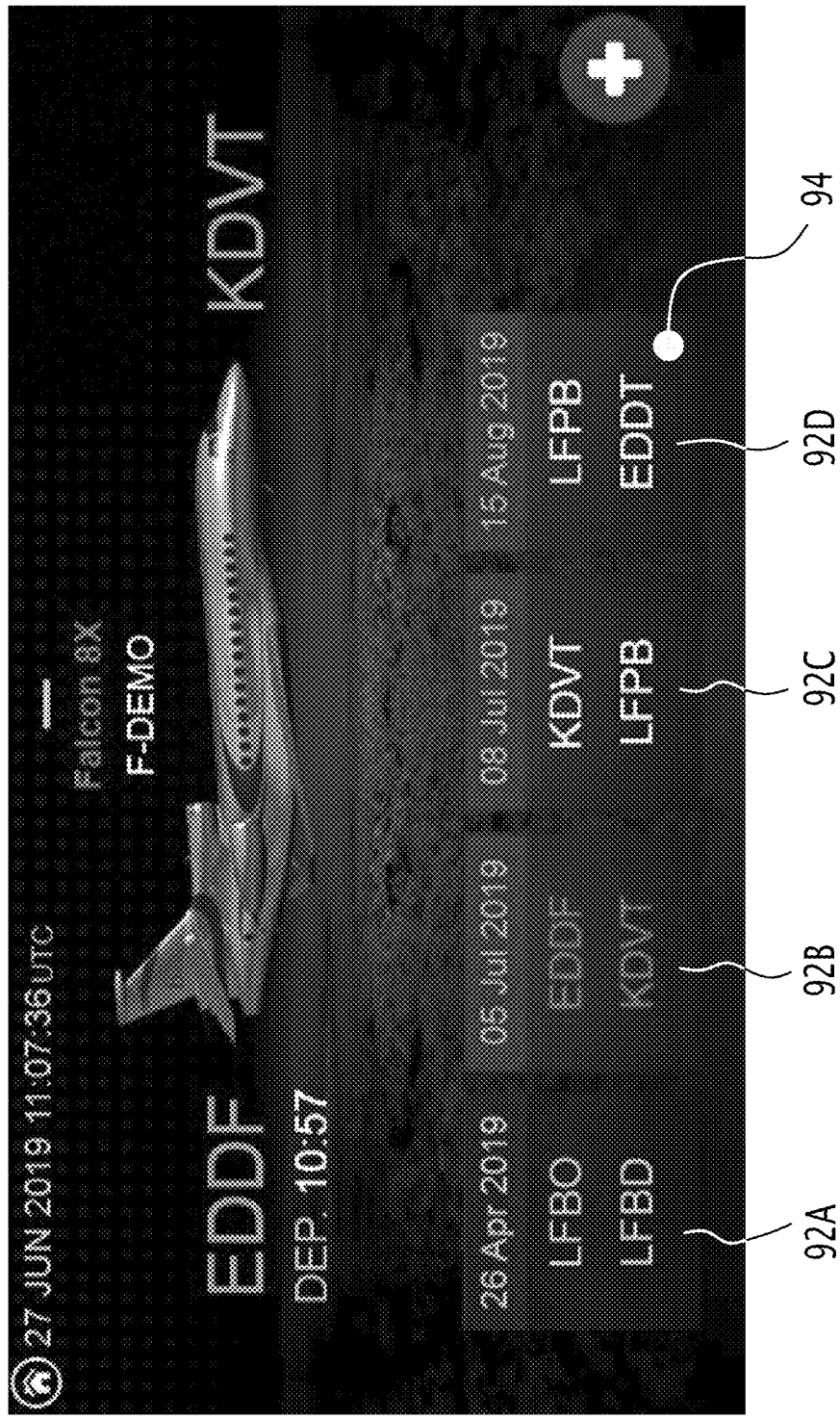
FIG. 3 is a view of a future flight planning display window generated by the monitoring system, the window presenting a global indicator of operational status.

With reference to FIG. 3, the display manager 26 is able to display at least a first global operational impact monitoring window 90.

The monitoring window 90 includes icons 92A, 92B, 92C, 92D showing successive missions of the aircraft.

Each icon 92A, 92B, 92C, 92D indicates here the date of the mission, the departure airport, and the arrival airport.

In addition, as soon as an operational impact measurement on the aircraft and/or on an aircraft equipment and/or on an aircraft consumable and/or on the aircraft crew presents a first impact value on the progress of the mission for the given mission, the display manager 26 is able to display on the display device 24 an operational impact indicator 94, here materialized by a colored dot to warn the crew that the mission will be impacted.

Figure 4:
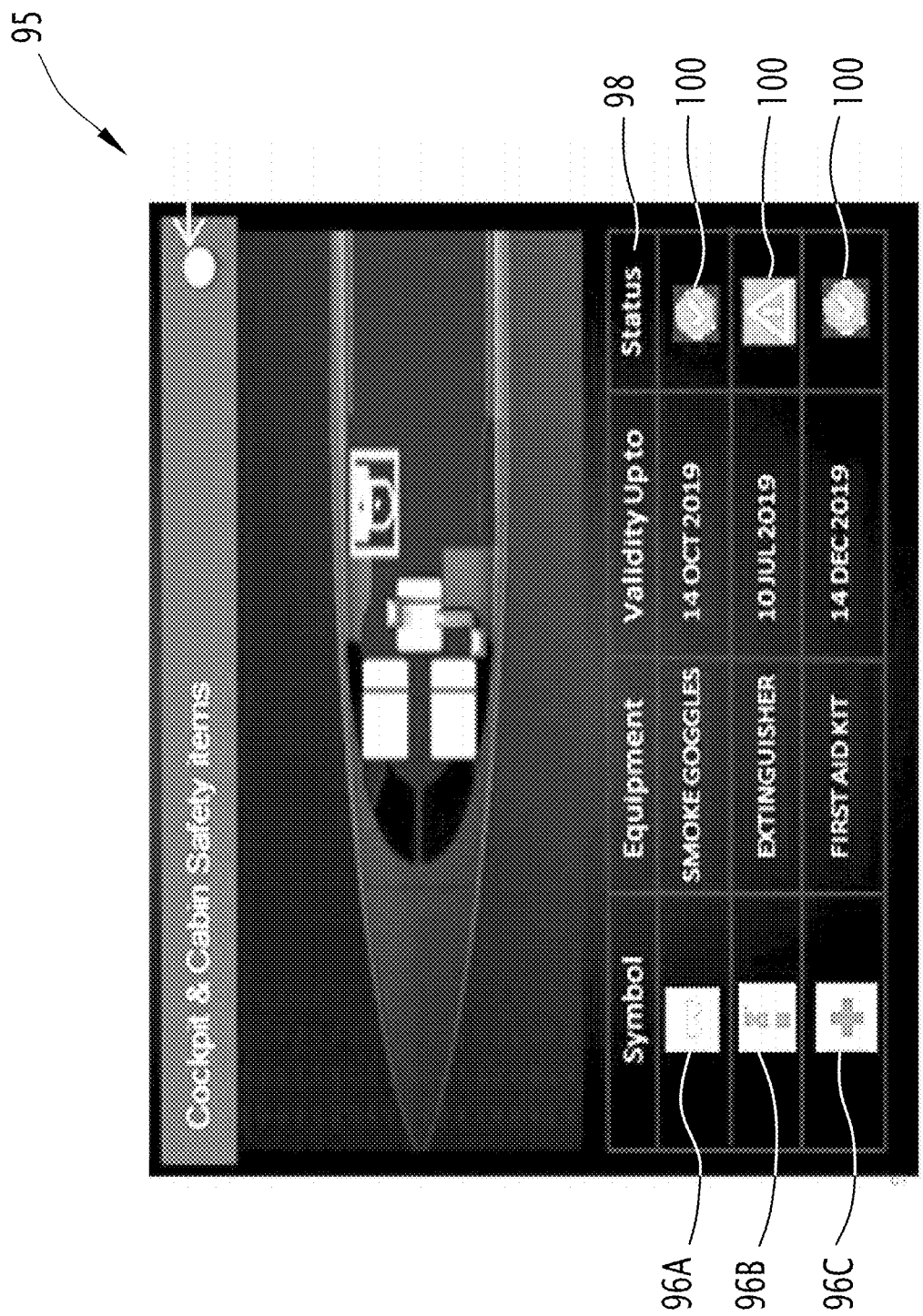
FIG. 4 is a view of an aircraft safety equipment status monitoring window, wherein the operational impact indicators are displayed.

The crew is able to select the mission concerned by clicking on the mission icon 92D using the human machine interface 28 to display at least one operational impact window 95 related to at least one piece of equipment and/or consumable of the aircraft, an example of which is shown in FIG. 4.

The window 95 shown, relates to cockpit and cabin safety equipment. This equipment is listed on successive lines 96A to 96C.

At least one column 98 shows operational impact indicators related to each piece of equipment using pictograms 100. The indicator presents a first appearance, for example a cross (X), when the operational impact measurement related to the equipment, determined by the computer 22, has a first value of operational impact on the mission and a second appearance, for example a check (✓) sign, when the operational impact measurement related to the equipment, determined by the computer 22, has a second value of no impact on the mission.

In this way, the pilot can easily distinguish which equipment will have an operational impact on the mission and take the necessary steps to ensure the successful completion of the future mission, such as replacing equipment that has reached its expiration date.

The display manager 26 is also able to display a consumable management window 110.

This window presents a first gauge 112 indicating the fuel level at the end of the previous mission on a scale showing the overall aircraft tank, a fuel level present in the aircraft 114 at the start of the current mission and an operational impact indicator 116 on the gauge, which takes on a first appearance when the gauge operational impact measurement determined by the computer 22 presents a first operational impact value and a second appearance when the gauge operational impact measurement determined by the computer 22 presents a second value of no operational impact on the future mission.

Similarly, the window 110 includes, for water and waste, water and waste level gauges 118 and indicators 120 of operational impact on the future mission that take a first appearance when the water or waste level operational impact measurement determined by the computer 22 presents a first operational impact value and a second appearance when the water or waste level operational impact measurement determined by the computer 22 presents a second no operational impact value on the future mission.

The window 110 or another window advantageously presents another operational impact indicator that takes on a first appearance when the inflation gas leakage operational impact measurement determined by the computer 22 presents a first operational impact value and a second appearance when the inflation gas leakage operational impact measurement determined by the computer 22 presents a second no operational impact value on the future mission.

The operation of the monitoring system 10 according to the present disclosure will now be described.

With reference to FIG. 2, during successive flights of the aircraft, the electronic recording system 30 is filled in by the pilot and by maintenance agents, to form successive sets of data from the flight logbook and technical logbook.

As described above, during flight preparation, the pilot or a maintenance person uses the input interface 36 to enter flight logbook and technical logbook data as described above.

This data is stored in the flight logbook database 32 set and the aircraft technical logbook database 34.

Then, after the flight 41, at the end of the flight 42, the pilot and/or a maintenance person again uses the input interface 36 to enter flight logbook data, as described above, and technical logbook data, as described above.

Similarly, the input interface 36 will interrogate the maintenance databases 48, 50 to load additional aircraft technical logbook data into the technical logbook database 34.

This data constitutes an aircraft technical logbook record, which is signed using the pilot signature interface 38 by the pilot, and which enriches the flight logbook database 32 and the aircraft technical logbook database 34.

Similarly, in mission preparation, the pilot or a mission planner uses the mission preparation system 60 to inform at least one future mission of the aircraft involving at least one flight.

The pilot thus informs the mission context related to that mission, as defined above. The mission context database 62 then contains the aircraft's future missions, and the calculation engine 66 is used to estimate at least the consumable consumption likely to occur in the aircraft's future missions.

When the user wishes to use the system 10, to monitor the status of the aircraft equipment and consumable, the interfaces 16, 18 are activated to receive in the storage memory 20 successive sets of flight logbook and technical logbook data obtained from the databases 32, 34 of the electronic recording system 30 and successive mission contexts obtained from the mission context database 32.

Alternatively or as a complement, flight logbook, technical logbook and/or mission context data are automatically retrieved from the aircraft and stored in the storage memory 20.

Once this is done, the computer 22 is activated to determine at least one operational impact measurement on at least one future aircraft mission related to the aircraft and/or aircraft equipment and/or consumable and/or aircraft crew.

Advantageously, the computer 22 calculates an operational impact date affecting the aircraft and/or physical equipment and/or an aircraft database based on flight logbook and/or technical logbook data or database update due date data stored in memory 20.

For this purpose, the calculation module 74 determines, for example, the scheduled or corrective maintenance dates of the aircraft, the validity dates of the aircraft's safety equipment, the database update deadlines.

The comparison module 76 compares these operational impact dates with the date of each future aircraft mission.

As indicated above, if the calculated operational impact date is before the mission date, the comparison module 76 is able to define an operational impact measurement with a first value corresponding to a mission impact.

On the contrary, if the operational impact date is later than the mission date, the comparison module 76 is able to define an operational impact measurement with a second value corresponding to no impact on the mission.

Similarly, the calculation module 76A for the number of take-offs and landings carried out by each pilot after each flight of a future mission determines the number of landings and/or take-offs over a given period carried out by a given pilot based on flight logbook data and the planning of the identity of the pilot in charge of the take-off and landing of each flight of the future mission.

The comparison module 76B compares this calculated number of take-offs and/or landings carried out by each given pilot with a minimum number of take-offs and/or landings to be carried out by each pilot over a given period of time resulting from regulatory requirements and to define an operational impact measurement for example in the form of a Boolean indicator as described above.

Furthermore, as illustrated in FIG. 5, the module 78 for determining an estimated fuel level present in the aircraft determines from flight logbook data the quantity of fuel $FQ(N)$ present in the aircraft at the end of the previous flight and divides it by the fuel density determined at the time of the survey to obtain a quantity of fuel $FQ'(N)$ independent of the density.

The comparison module 80 with a measured or recorded consumable level calculates the difference between the amount of fuel $FQ'(N)$ present in the aircraft independent of density at the end of the previous flight and the amount of fuel $FQ(N+1)$ present in the aircraft at the start of the next flight divided by the density at the start of the flight, showing an amount of fuel $FQ'(N+1)$ present in the aircraft at the start of the next flight independent of density.

If the difference between the quantities of fuel $FQ'(N)$, $FQ'(N+1)$ independent of density is greater than a predefined threshold value, the comparison module 80 defines an operational impact measurement of consumable leakage with a first value corresponding to an impact on the mission.

On the contrary, if the difference between the density independent fuel quantities $FQ'(N)$, $FQ'(N+1)$ are less than a predefined threshold value, the comparison module 80 defines an operational impact measurement of consumable leakage with a second value corresponding to no mission impact.

In the case of a fuel addition, the module 78 for determining an estimated consumable level present in the aircraft determines a first value of the fuel level present in the aircraft after the addition of fuel $FQ'(N)+AJ'(N+1)$ independent of density, on the basis of flight logbook data comprising the amount of fuel $FQ(N)$ present in the aircraft at the end of the previous flight, divided by the density at the end of the previous flight, designated as $FQ'(N+1)$, and the amount of fuel added at the start of the next flight $AJ(N+1)$, divided by the density at the start of the next flight, designated as $AJ'(N+1)$.

The comparison module 80 with a measured or recorded fuel level calculates the difference between the first value of fuel level present in the aircraft after the addition of fuel $FQ'(N)+AJ'(N+1)$ independent of the density and the amount of fuel $FQ(N+AJ)$ present in the aircraft at the start of the next flight, divided by the density at the start of the next flight, designated as $FQ'(N+AJ)$.

If the difference between the quantities of fuel $FQ'(N)+AJ'(N+1)$, $FQ'(N+AJ)$ independent of the density is greater than a predefined threshold value, the comparison module 80 defines an operational impact measurement of the consumable level gauge with a first value corresponding to a mission impact.

On the contrary, if the difference between the fuel quantities $FQ'(N)+AJ'(N+1)$, $FQ'(N+J)$ independent of the density is less than a predefined threshold value, the comparison module 80 defines an operational impact measurement of the consumable level gauge with a second value corresponding to no mission impact.

Similarly, based on mission context data, the consumable level determination module 82 determines an oil and/or water level likely to be consumed during a future aircraft mission and a waste level likely to be generated during the mission.

The comparison module 84 determines the estimated difference between the oil level, water level, and waste level at the end of the mission, obtained from flight logbook data, and the oil level, water level, and waste level present at the start of the mission, obtained advantageously from aircraft systems. If the difference between the water or oil level present at the start of the mission, as obtained from the flight logbook data, and the water or oil level likely to be consumed during the future mission of the aircraft is less than a threshold value, or if the sum of the level of waste likely to be produced during the mission and the level of waste present in the aircraft at the start of the mission is greater than a threshold value, the comparison module 80 defines an operational impact measurement of the level of consumable with a first value corresponding to an impact on the mission.

On the contrary, if the difference between the water or oil level present at the start of the mission, as obtained from flight logbook data, and the water or oil level likely to be consumed during the future mission of the aircraft is below a threshold value, or if the sum of the level of waste likely to be produced during the mission and the level of waste present in the aircraft at the start of the mission is less than a threshold value, the comparison module 80 defines an operational impact measurement of consumable level with a second value corresponding to no impact on the mission.

Advantageously, the module 78 for determining an estimated level of consumable present in the aircraft calculates the difference between the pressures of two aircraft tires measured at the end of each mission.

The module 80 for comparison with a measured or recorded level of consumable calculates the variation in tire pressure difference, between the difference calculated at the end of the previous flight and the difference calculated at the start of the next flight.

If the variation between tire pressure differences is greater than a predefined threshold value, the comparison module 80 defines an operational impact measurement of inflation gas leakage with a first value corresponding to an impact on the mission.

On the contrary, if the variation between tire pressure differences is less than a predefined threshold value, the comparison module 80 defines an operational impact measurement of inflation gas leakage with a second value corresponding to no mission impact.

Then, the operational impact measurement values of the various aircraft equipment and/or consumables are transmitted to the display manager 26.

If at least one operational impact review presents a first operational impact value, on one of the future missions, the mission manager generates an operational impact monitoring window in which the icon 92 corresponding to the mission in which the operational impact indicator with the first value is obtained is displayed, with an operational impact indicator 94 indicating an operational impact on this mission.

When the user selects this mission, the display manager 26 displays the operational impact window 95 related to at least one piece of equipment and/or consumable of the aircraft, illustrated in FIG. 4.

It can then easily visualize that the equipment shown on line 96B, here the fire extinguisher, will have an operational impact on the mission in question.

The aircraft operator is then able to take the necessary measures to change this equipment before the expiry date of the equipment.

Similarly, the operator is able to display the consumable management window 110 generated by the display manager 26.

In this window, the operational impact indicators 116 are displayed with an appearance that depends on the value of the operational impact measurement of the consumable on the aircraft, determined by the computer 22.

The monitoring system 10 just described thus facilitates, in mission preparation, the tasks of the aircraft crew when it recovers the aircraft, so that the crew can easily see whether aircraft equipment and/or consumables are likely to have an operational impact on future missions.

Thus, operational data obtained from the flight logbook and technical logbook data is monitored and alerts are put in place when operational impact dates are likely to interfere with the smooth running of the mission.

In addition, the level of consumables is estimated, which makes it possible to monitor the absence of fuel leaks or tire pressure or the consolidation of fuel gauge values, and to automatically track how system consumables such as oil, water and waste are likely to have an impact on the progress of a future mission.

The monitoring system 10 works very easily by simply recording data from the flight logbooks and technical logbooks of the aircraft, and providing information for future missions.

In a variant, the monitoring system 10 is equipped with an interface for entering a new mission context to allow loading and entering a mission context for future missions directly via the human-machine interface 28.

In the above described embodiments, the operational impact measurement computer 22 is able to determine at least one operational impact measurement on the at least one future mission of the aircraft by using a processor locally present in the on-board system intended to be integrated into the aircraft cockpit 12 or in the portable electronic device 14. In a variant, the operational impact measurement computer 22 is able to determine at least one operational impact measurement on the at least one future mission of the aircraft by querying at least a processor located remotely, for example located in a cloud computing infrastructure.

What is claimed is:

1. An aircraft operational status monitoring system to monitor an aircraft operational status between successive aircraft missions comprising:
   a first interface configured to enter and/or to load sets of flight logbook data and technical logbook data, each set of the sets of flight logbook data and technical logbook data corresponding to a successive flight of an aircraft during at least one mission, the first interface being configured to acquire a level of consumable at an end of each of the at least one mission and/or at a start of each of the at least one mission;
   a second interface configured to enter and/or to load a mission context containing mission context data of at least one future mission of the aircraft;
   a computer configured to determine at least one operational impact measurement on the at least one future mission of the aircraft, the at least one operational impact measurement being related to a consumable of the aircraft, the at least one operational impact measurement being determined as a function of the flight logbook data and/or the technical logbook data of at least one already completed mission of the aircraft and/or as a function of the mission context of the at least one future mission of the aircraft; and
   a display and a display manager on the display, wherein the display manager is configured:
      to display on the display a global operational impact monitoring window, the monitoring window including mission icons respectively showing successive missions of the aircraft, the successive missions including the at least one future mission; and
      to display at least one operational impact indicator related to the mission icon associated with the at least one future mission being impacted, to alert that the at least one future mission will be impacted, if the at least one operational impact measurement determined by the computer has a first value of operational impact on the at least one future mission,
   wherein the level of consumable is selected among a fuel level, a water level, an oil level, a waste level, and/or an air pressure level in a tire of the aircraft;
   wherein the computer is configured:
      to determine an estimated level of consumable present in the aircraft based on the flight logbook data obtained from the first interface and to compare the estimated level of consumable present in the aircraft with a measured or recorded level of consumable, to obtain the at least one operational impact measurement; and/or
      to determine a consumable level present in the aircraft at an end of a future mission based on an estimate of a consumable level consumed during a previous mission obtained from the flight logbook data via the first interface and based on the mission context data obtained via the second interface, in order to obtain the at least one operational impact measurement.

2. The system according to claim 1, wherein the at least one operational impact measurement is chosen between a first value of operational impact on the mission to be carried out and a second value of no operational impact on a mission to be carried out.

3. The system according to claim 1, wherein the computer is configured to determine at least one other operational impact measurement on the at least one future mission of the aircraft, the at least one other operational impact measurement being related to the aircraft and/or to equipment, wherein the computer is configured to calculate an operational impact date affecting the aircraft and/or affecting the equipment and/or affecting a database, based on the flight logbook data and/or on the technical logbook data or using a database update due date data, the computer being configured to compare the operational impact date with a date of the at least one future mission obtained from the second interface, to determine the at least one other operational impact measurement.

4. The system according to claim 3, wherein the computer is configured to calculate the operational impact date from the technical logbook data obtained from the first interface, the technical logbook data including at least one scheduled maintenance visit date or data from at least one failure and/or defect discovered on a previous mission.

5. The system according to claim 3, wherein the computer is configured to calculate the operational impact date relating to a validity of physical equipment, based on an equipment installation date retrieved from the technical logbook data and based on a predefined equipment lifetime.

6. The system according to claim 1, wherein the computer is configured to determine at least one other operational impact measurement on the at least one future mission of the aircraft, the at least one other operational impact measurement being related to a crew of the aircraft, wherein the at least one other operational impact measurement comprises a second operational impact measurement related to a pilot no longer meeting regulatory requirements, the computer being configured to determine the second operational impact measurement related to the pilot no longer meeting regulatory requirements, based on a number of take-offs and landings made by the pilot on the aircraft on the basis of the flight logbook data obtained from the first interface.

7. The system according to claim 1, wherein the second interface is configured to enter or/and to load a new mission context for a new mission including data for at least one future mission.

8. The system according to claim 1, wherein the second interface is configured to enter and/or to load mission context data of a plurality of successive future missions of the aircraft, the computer being configured to determine, for each of the successive future missions of the aircraft, an operational impact measurement related to the aircraft and/or to equipment and/or to the consumable and/or to a crew of the aircraft for each of the successive future missions of the aircraft.

9. The system according to claim 1, wherein the system further comprises a human machine interface, the mission icons being actionable using the human machine interface, so that, upon actuation of the mission icon associated with the impacted future mission, the display manager is configured to display at least one operational impact window related at least to the consumable, the operational impact window having at least one gauge associated with the consumable, so that an appearance of the gauge depends on the at least one operational impact measurement determined by the computer.

10. An aircraft operational status monitoring method using the aircraft operational status monitoring system of claim 1, the method comprising:

retrieving the flight logbook data and the technical logbook data of the aircraft via the first interface of the aircraft operational status monitoring system, the first interface being configured to enter and/or load flight logbook data and technical logbook data sets of the aircraft, and acquiring the level of consumable at the end of each of the at least one mission and/or at the start of each of the at least one mission;

retrieving the mission context data of the aircraft by the second interface of the aircraft operational status monitoring system, the second interface being configured to enter and/or to load the mission context for the at least one future mission to be carried out by the aircraft;

determining, by the computer of the aircraft operational status monitoring system, the at least one operational impact measurement related to the consumable of the aircraft on the at least one future mission of the aircraft as a function of the flight logbook data and/or of the technical logbook data of the aircraft of missions already carried out by the aircraft and/or as a function of a context of the future mission; and displaying on the display, by the display manager, the at least one operational impact indicator corresponding to the at least one operational impact measurement determined by the computer, wherein the level of consumable is selected among a fuel level, a water level, an oil level, a waste level, and/or an air pressure level in a tire of the aircraft;

wherein the computer:

determine the estimated level of consumable present in the aircraft based on the flight logbook data obtained from the first interface and to compare the estimated level of consumable present in the aircraft with the measured or recorded level of consumable, to obtain the at least one operational impact measurement; and/or determine the consumable level present in the aircraft at the end of the future mission based on the estimate of a consumable level consumed during the previous mission obtained from the flight logbook data via the first interface and based on the mission context data obtained via the second interface, in order to obtain the at least one operational impact measurement.

11. The method according to claim 10, wherein the determining of the at least one operational impact measurement is carried out after an end of a mission of the aircraft, and before a new mission of the aircraft.

12. An aircraft operational status monitoring system to monitor an aircraft operational status between successive aircraft missions comprising:

a first interface configured to enter and/or to load sets of flight logbook data and technical logbook data, each set of the sets of flight logbook data and technical logbook data corresponding to a successive flight of the aircraft during at least one mission;

a second interface configured to enter and/or to load a mission context containing mission context data of at least one future mission of the aircraft;

a computer configured to determine at least one operational impact measurement on the at least one future mission of the aircraft, the at least one operational impact measurement being related to software equipment, the at least one operational impact measurement being determined as a function of the flight logbook data and/or the technical logbook data of at least one already completed mission of the aircraft and/or as a function of the mission context of the at least one future mission of the aircraft; and a display and a display manager on the display, wherein the display manager is configured:

to display on the display a global operational impact monitoring window, the monitoring window including mission icons respectively showing successive missions of the aircraft, the successive missions including the at least one future mission; and to display at least one operational impact indicator related to the mission icon associated with the at least one future mission being impacted, to alert that the at least one future mission will be impacted, if the at least one operational impact measurement determined by the computer has a first value of operational impact on the at least one future mission.

13. The system according to claim 12, wherein the computer is configured to calculate an operational impact date affecting a database of the software equipment, based on the flight logbook data and/or on the technical logbook data or using a database update due date data, the computer being configured to compare the operational impact date with a date of the at least one future mission obtained from the second interface, to determine the at least one operational impact measurement.

14. The system according to claim 12, wherein the system further comprises a human machine interface, the mission icons being actionable using the human machine interface, so that, upon actuation of the mission icon associated with the impacted future mission, the display manager is configured to display at least one operational impact window related at least to the software equipment, the operational impact window having at least one indicator associated with the software equipment, so that an appearance of the indicator depends on the at least one operational impact measurement determined by the computer.

15. The system according to claim 14, wherein the operational impact window has a list of pictograms respectively related to a plurality of pieces of equipment, the pieces of equipment including the software equipment, the operational impact window having, for each of the pieces of equipment, an indicator associated with the piece of equipment, so that an appearance of the indicator associated with the piece of equipment depends on the at least one operational impact measurement determined by the computer.

16. An aircraft operational status monitoring system to monitor an aircraft operational status between successive aircraft missions comprising:

a first interface configured to enter and/or to load sets of flight logbook data and technical logbook data, each set of the sets of flight logbook data and technical logbook data corresponding to a successive flight of the aircraft during at least one mission;

a second interface configured to enter and/or to load a mission context containing mission context data of at least one future mission of the aircraft;

a computer configured to determine at least one operational impact measurement on the at least one future mission of the aircraft, the at least one operational impact measurement being related to a crew of the aircraft, the at least one operational impact measurement being determined as a function of the flight logbook data and/or the technical logbook data of at least one already completed mission of the aircraft and/or as a function of the mission context of the at least one future mission of the aircraft; and a display and a display manager on the display, wherein the display manager is configured:

to display on the display a global operational impact monitoring window, the monitoring window including mission icons respectively showing successive missions of the aircraft, the successive missions including the at least one future mission; and to display at least one operational impact indicator related to the mission icon associated with the at least one future mission being impacted, to alert that the at least one future mission will be impacted, if the at least one operational impact measurement determined by the computer has a first value of operational impact on the at least one future mission;

wherein the at least one operational impact measurement comprises another operational impact measurement related to a pilot no longer meeting regulatory requirements, the computer being configured to determine the another operational impact measurement related to the pilot no longer meeting regulatory requirements, based on a number of take-offs and landings made by the pilot on the aircraft on the basis of the flight logbook data obtained from the first interface.

* * * * *